United States Patent
Kakishima et al.

(10) Patent No.: US 10,518,663 B1
(45) Date of Patent: Dec. 31, 2019

(54) VEHICLE SEAT

(71) Applicant: TACHI-S ENGINEERING U.S.A., INCORPORATED, Farmington Hills, MI (US)

(72) Inventors: Yasuo Kakishima, Farmington Hills, MI (US); Anand Abraham, Farmington Hills, MI (US)

(73) Assignee: TACHI-S ENGINEERING U.S.A., INCORPORATED, Farmington Hills, MI (US)

( * ) Notice: Subject to any disclaimer, the term of this patent is extended or adjusted under 35 U.S.C. 154(b) by 18 days.

(21) Appl. No.: 16/027,857

(22) Filed: Jul. 5, 2018

(51) Int. Cl.
*B60N 2/015* (2006.01)
*B60N 2/30* (2006.01)

(52) U.S. Cl.
CPC ........... *B60N 2/0155* (2013.01); *B60N 2/305* (2013.01); *B60N 2/3011* (2013.01); *B60N 2/3093* (2013.01)

(58) Field of Classification Search
None
See application file for complete search history.

(56) References Cited

U.S. PATENT DOCUMENTS

| 5,219,202 | A | * | 6/1993 | Rink | B60N 2/42709 |
| | | | | | 297/216.13 |
| 6,254,181 | B1 | * | 7/2001 | Aufrere | B60N 2/4221 |
| | | | | | 297/216.1 |
| 9,487,157 | B1 | * | 11/2016 | Vinton | B60N 2/64 |
| 9,758,070 | B1 | * | 9/2017 | Salenbien | B60N 2/305 |
| 2008/0164711 | A1 | * | 7/2008 | Zambon | B60N 2/3031 |
| | | | | | 296/65.03 |
| 2015/0115680 | A1 | * | 4/2015 | Mabashi | B60N 2/06 |
| | | | | | 297/334 |
| 2019/0031352 | A1 | * | 1/2019 | Pierson-Moonan | ......................... |
| | | | | | B64D 11/064 |

FOREIGN PATENT DOCUMENTS

| FR | 2796602 | A1 | | 1/2001 | |
| FR | 2920012 | A1 | * | 2/2009 | ........... B60N 2/0155 |
| JP | H01-87043 | U | | 6/1989 | |
| JP | H01-226448 | A | | 9/1989 | |
| JP | H04-57432 | U | | 5/1992 | |
| JP | 06-65074 | U | | 9/1994 | |
| JP | 2011-168961 | A | | 9/2011 | |
| JP | 2016-159703 | A | | 9/2016 | |
| WO | WO-2018215395 | A1 | * | 11/2018 | ............... B60N 2/22 |

OTHER PUBLICATIONS

International Search Report and the Written Opinion of the International Searching Authority dated Sep. 25, 2019 in PCT/US2019/028876.

* cited by examiner

*Primary Examiner* — David E Allred
(74) *Attorney, Agent, or Firm* — Fitch, Even, Tabin & Flannery L.L.P.

(57) ABSTRACT

A vehicle seat includes: (a) a seat structure having a seat cushion frame including a first seat side member and a second seat side member, and a seat back frame; (b) a seat slide mechanism that is capable of moving the seat structure; (c) a first upper riser that is fixed to the seat slide mechanism and supports the first seat side member; (d) a second upper riser that is fixed to the seat slide mechanism and supports the second seat side member; (e) a first locking mechanism that locks and unlocks the first seat side member to and from the seat slide mechanism; and (f) a second locking mechanism that locks the second seat side member to the seat slide mechanism when an excessive load is input.

9 Claims, 9 Drawing Sheets

VEHICLE SEAT

BACKGROUND

The present disclosure relates to a vehicle seat, and is applicable to, for example, a vehicle seat having a tumble function.

Among the vehicle seats, there is a tumble seat (flip-up seat) in which after a seat back of a rear row seat (a second row seat, a third row seat) has been inclined forward, the seat back is flipped up forward together with a seat cushion to provide a luggage room there.

The vehicle seat as described above is equipped with a lock device that is locked to or unlocked from a striker installed on a floor so that the vehicle seat can be locked and unlocked with respect to the floor (for example, Japanese Unexamined Patent Application Publication No. 2011-168961). In the vehicle seat, the locking devices are provided on both of right and left sides on a rear end side of the seat cushion, and those locking devices are engaged and locked to the striker on the floor at all times, as a result of which the seat cushion is locked and held in a posture state in which the seat cushion is lying on the floor.

SUMMARY

Strength is required for the locking device so that the lock is not released even when a load is excessively input to the vehicle seat. If the locking device is provided on each of the right and left sides as in Japanese Unexamined Patent Application Publication No. 2011-168961, or if a heavy-duty locking device is provided on either of the right and left sides, a weight is increased and the cost is increased.

An object of the present disclosure is to provide a vehicle seat having a safe and light weight locking device.

Other problems and novel features will be apparent from a description of the present disclosure and the accompanying drawings.

An outline of a representative configuration of the present disclosure will be briefly described as follows.

In other words, the vehicle seat includes: (a) a seat structure having a seat cushion frame including a first seat side member and a second seat side member, and a seat back frame; (b) a seat slide mechanism that is capable of moving the seat structure; (c) a first upper riser that is fixed to the seat slide mechanism and supports the first seat side member; (d) a second upper riser that is fixed to the seat slide mechanism and supports the second seat side member; (e) a first locking mechanism that locks and unlocks the first seat side member to and from the seat slide mechanism; and (f) a second locking mechanism that locks the second seat side member to the seat slide mechanism when an excessive load is input.

DESCRIPTION OF THE PREFERRED EMBODIMENTS

Figure 1:
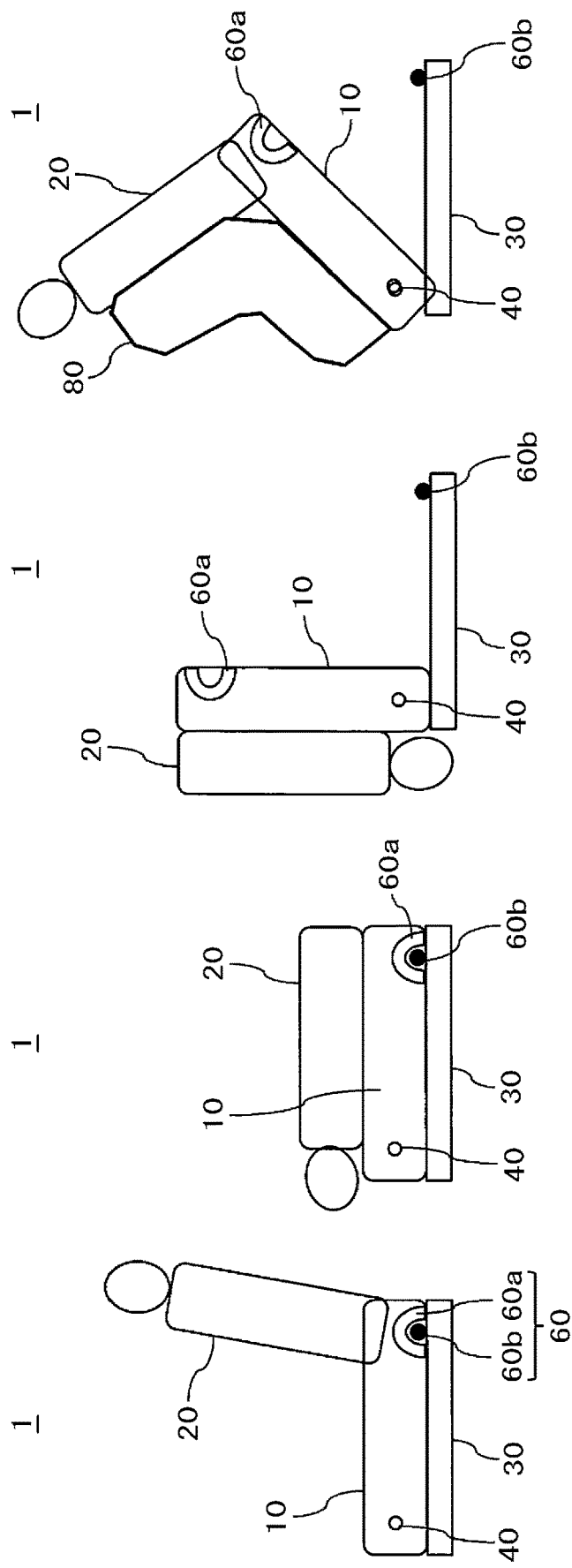
FIG. 1A is a side view of a vehicle seat in a normal state according to an embodiment.
FIG. 1B is a side view of the vehicle seat shown in FIG. 1A in a state where a seat back is folded down.
FIG. 1C is a side view of the vehicle seat shown in FIG. 1B in a state where the seat back is flipped up forward together with a seat cushion.
FIG. 1D is a side view of the vehicle seat of FIG. 1A in a state of falling forward.

Hereinafter, an embodiment will be described with reference to the accompanying drawings. In the following description, the same reference numerals are given to the same components, and repetitive explanation may be omitted. In order to make the description clearer, the drawings may be schematically represented in terms of the width, thickness, shape, and so on of each part as compared with an actual form, but the drawings are only an example, and do not restrict the interpretation of the present invention.

A vehicle seat according to an embodiment will be described with reference to FIGS. 1A to 1D. FIG. 1A is a side view of a vehicle seat in a normal state according to an embodiment. FIG. 1B is a side view of the vehicle seat shown in FIG. 1A in a state where a seat back is folded down. FIG. 1C is a side view of the vehicle seat shown in FIG. 1B in a state where the seat back is flipped up forward together with a seat cushion. FIG. 1D is a side view of the vehicle seat of FIG. 1A in a state of falling forward.

In the following description, a vertical direction is defined as an up-down direction with reference to a case where a vehicle in which a vehicle seat 1 is installed is placed on a horizontal plane. In addition, a front-rear direction (FR, RR) is defined so as to coincide with a front-rear direction of the vehicle, and a right-left direction (width direction) is defined so as to coincide with a width direction of the vehicle. FR is a front direction of the vehicle, and RR is a rear direction of the vehicle. Further, the vehicle seat 1 will be described as being referred to as a right side (RH) and a left side (LH) viewed from the rear of the vehicle.

As shown in FIGS. 1A to 1C, the vehicle seat 1 is a tumble seat (flip-up seat) in which after a seat back of a rear row seat (a second row seat, a third row seat, and so on) has been inclined forward, the seat back is flipped up forward together with a seat cushion to provide a luggage room there.

There are multiple seats in the back row seat in a row, and a right seat will be described below. Incidentally, a left seat is configured in the same way with the right and left sides of the right seat reversed.

The vehicle seat 1 has a seat cushion 10 that supports buttocks of a seated person, a seat back 20 that supports a back of the seated person, and a seat slide mechanism 30. The vehicle seat 1 has a reclining device (refer to FIG. 2), and the seat back 20 can tilt forward and backward with respect to the seat cushion 10.

A front portion of the seat cushion 10 is attached to the seat slide mechanism 30 through a hinge mechanism 40. A locking mechanism 60 having a locking device 60a that can be locked or unlocked to or from a striker 60b provided above the seat slide mechanism 30 is disposed at a rear portion on the left side of the seat cushion 10. Therefore, the locking mechanism 60 is unlocked with the result that the vehicle seat 1 can be flipped up with respect to the seat slide mechanism 30 around the hinge mechanism 40 as a center. Incidentally, a locking mechanism is disposed on the right side of the seat cushion 10, and the locking mechanism is not locked in a normal state but is locked when an excessive load is input.

Figure 2:
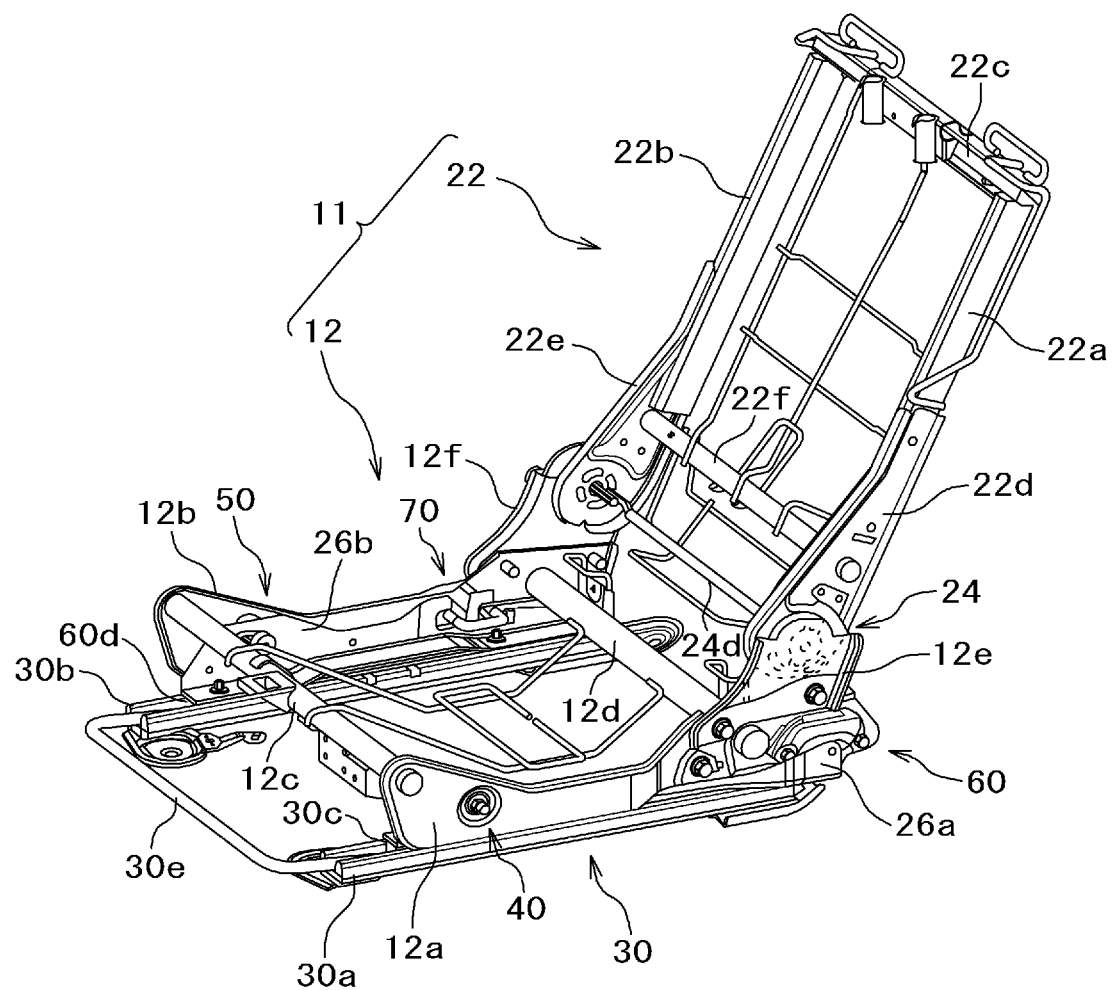
FIG. 2 is a front perspective view of a seat structure.
Figure 3:
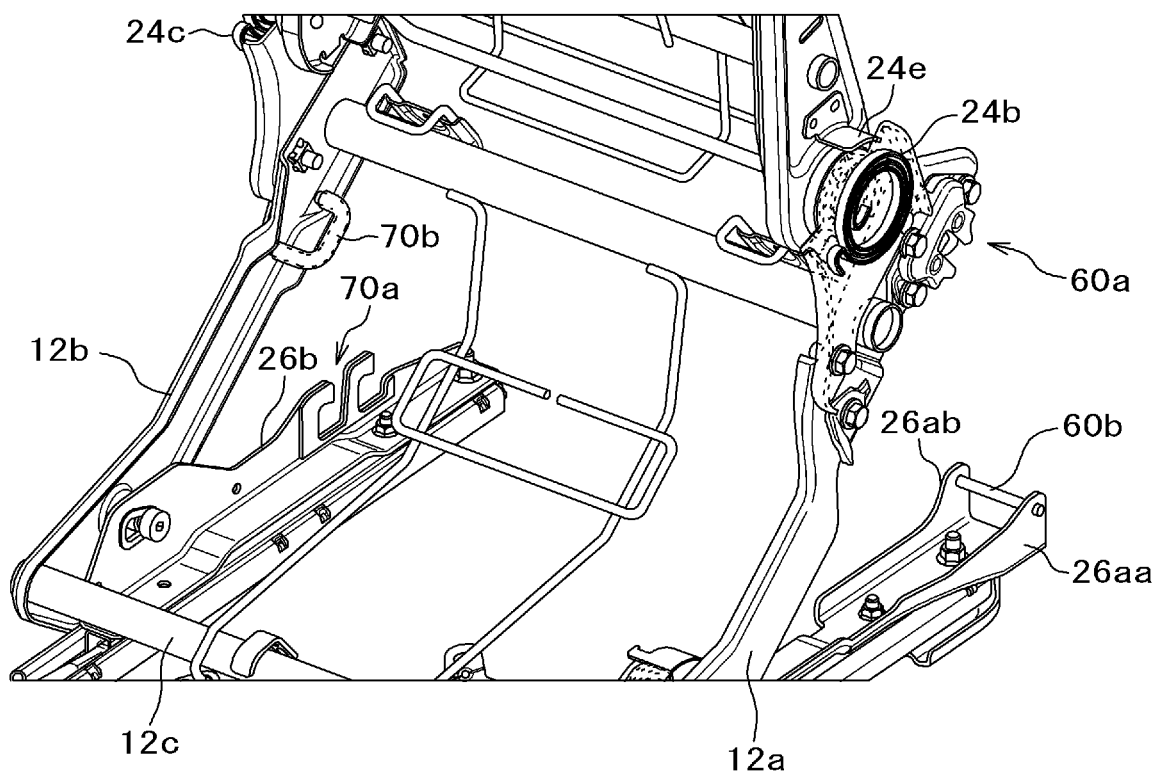
FIG. 3 is a front perspective view showing a locking mechanism of the seat structure in FIG. 2.
Figure 4:
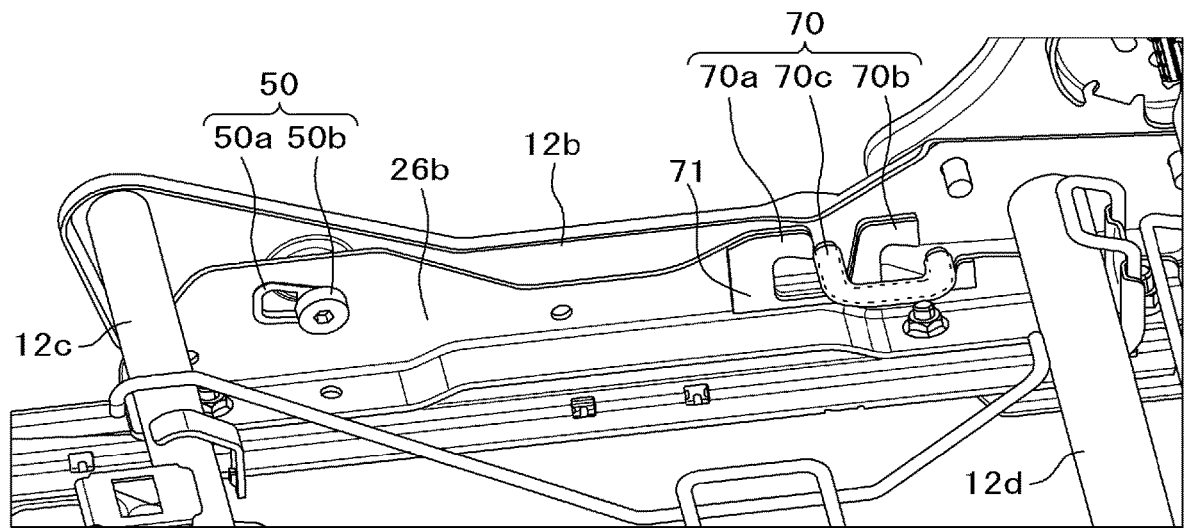
FIG. 4 is a top perspective view showing a hinge mechanism and the locking mechanism on a right side of the seat structure of FIG. 2.
Figure 5:
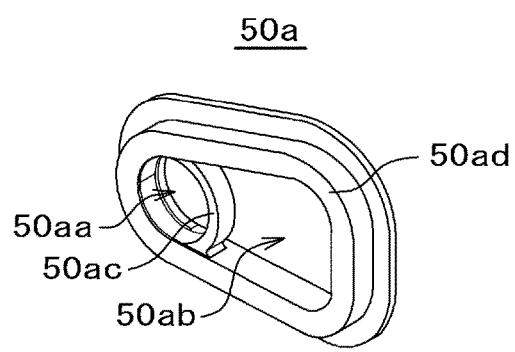
FIG. 5 is a front perspective view showing a nylon bush of FIG. 4.

Next, the seat structure will be described with reference to FIGS. 2 to 5. FIG. 2 is a front perspective view of the seat structure. FIG. 3 is a front perspective view showing a locking mechanism of the seat structure in FIG. 2. FIG. 4 is a top perspective view showing a hinge mechanism and the locking mechanism on the right side of the seat structure of FIG. 2. FIG. 5 is a front perspective view showing a bush of FIG. 4.

A seat structure 11 includes a seat cushion frame 12 and a seat back frame 22 and is attached to the seat slide mechanism 30. The seat slide mechanism 30 allows a longitudinal movement along the front direction of the seat structure 11.

The seat cushion 10 includes a seat cushion frame 12, a urethane pad, and a cover. The seat back 20 also has the same configuration and is formed of a urethane pad which is fixed to the seat back frame 22 and wrapped with a cover.

The seat cushion frame 12 includes seat side members 12a and 12b, a front cross member pipe 12c that is connected at front portions of the seat side members 12a and 12b, a rear cross member pipe 12d that is connected at rear portions of the seat side members 12a and 12b, and recliner brackets 12e and 12f that are connected at the rear portions of the seat side members 12a and 12b.

The seat back frame 22 includes back side frames 22a and 22b, an upper cross member 22c that is connected to upper portions of the back side frames 22a and 22b, brackets 22d and 22e that are connected to lower portions of the back side frames 22a and 22b, and a lower cross member 22f that is connected to the brackets 22d and 22e.

The seat structure 11 includes a recliner mechanism 24 in which the seat back frame 22 rotates with respect to the seat cushion frame 12. Therefore, the seat back frame 22 is supported by the recliner brackets 12e and 12f having the recliner mechanism 24. The recliner mechanism 24 includes a recliner 24a (refer to FIG. 8) that is attached to the recliner bracket 12e, recliner assist springs 24b and 24c, a recliner connection rod 24d, attachment brackets 24e and 24f (refer to FIG. 8) that are attached to the brackets 22d and 22e, respectively. In the recliner mechanism 24, the seat back frame 22 is rotatable about a lateral axis.

The vehicle seat 1 includes upper risers 26a and 26b that support the seat cushion frame 12. A hinge mechanism 40 is attached to a connection portion with the seat side member 12a in a front portion of the upper riser 26a and a striker 60b of the lock mechanism 60 is attached to the connection portion in a rear portion of the upper riser 26a. A hinge mechanism 50 is attached to a connection portion with the seat side member 12b in a front portion of the upper riser 26b and a hook 70a of the lock mechanism 70 is attached to the connection portion in a rear portion of the upper riser 26b. Bottom surfaces of the upper risers 26a and 26b are fastened to the upper rails 30c and 30d of the seat slide mechanism 30 by bolts or the like as fixing members.

The seat slide mechanism 30 includes a pair of lower rails 30a, 30b, upper rails 30c, 30d corresponding to the lower rails, and a towel bar 30e. The upper rails 30c and 30d are engaged with the respective lower rails 30a and 30b and move along the longitudinal direction. The seat slide mechanism 30 includes stopper pins that are engaged with openings in the upper rails 30c, 30d and the corresponding lower rails 30a, 30b. As a result, movement of the seat structure 11 in the longitudinal direction is prevented. In order to move the seat structure 11, an occupant lifts up the towel bar 30e, to thereby disengage the stopper pins from the openings and enable the upper rails 30c and 30d to move relative to the lower rails 30a and 30b.

The hinge mechanism 40 is configured so as to hinge-couple the upper riser 26a and the seat side member 12a with each other, and flips up the seat structure 11 forward by an urging force of an auxiliary spring 40a. In this example, the auxiliary spring 40a is a spiral spring, an inner terminal of the auxiliary spring 40a is locked to a bracket attached to an inside of the upper riser 26a, and an outer terminal of the auxiliary spring 40a is locked to a bracket that is rotated backward and attached to an inside of the seat side member 12a.

As shown in FIG. 3, the lock mechanism 60 includes a striker 60b that is provided on the upper riser 26a and a locking device 60a that is fixed to the seat side member 12a. More specifically, a rear portion of the upper riser 26a has an outer wall 26aa and an inner wall 26ab, and the striker 60b is attached to upper portions of the walls 26aa and 26ab across the walls 26aa and 26ab. As described in, for example, Japanese Unexamined Patent Application Publication No. 2011-168961, the locking device 60a is pushed toward the striker 60b, as a result of which the locking device 60a operates to be engaged and locked with the striker 60b while the locking mechanism inside the locking device 60a is pushed by the striker 60b. The locking device 60a is configured to release an engagement locked state with respect to the striker 60b by operating a release lever not shown.

As shown in FIG. 4, the hinge mechanism 50 includes a bush 50a that is fitted in the hole of the upper riser 26b and a rotating hinge pin 50b that is attached from the side of the upper riser 26b through the holes of the bush 50a and the seat side member 12b. As shown in FIG. 5, the bush 50a has a first hole 50aa into which the rotating hinge pin 50b is inserted at the time of attachment and a second hole 50ab, and a partition wall 50ac of the first hole 50aa and the second hole 50ab is formed to be thinner than a periphery of the partition wall 50ac, and can be destroyed when the load input is excessive. The bush 50a is preferably made of, for example, nylon (polyamide synthetic resin).

As shown in FIG. 4, the lock mechanism 70 includes a striker 70c that is fixed to the seat side member 12b and formed of a U-shaped wire in a plan view, and hooks 70a and 70b that are provided on the upper riser 26b and the bracket 71, respectively. The hooks 70a and 70b include two recesses shaped in hook in a side view and formed in the upper riser 26b and a bracket 71 that is fixed to a left side of the upper riser 26b and having a recess of the same shape as that of the hook shaped recesses. The hooks 70a and 70b have openings on the rear side, and are configured such that the front side of the striker 70c is located at the rear of the hook 70a and in front of the hook 70b, and the rear side of the striker 70c is located at the rear of the hook 70b. The striker 70c is inserted into the hooks 70a and 70b.

Next, the operation of the seat structure will be described with reference to FIGS. 1A to 1D, 2, 3, 6 and 7.

Figure 6:
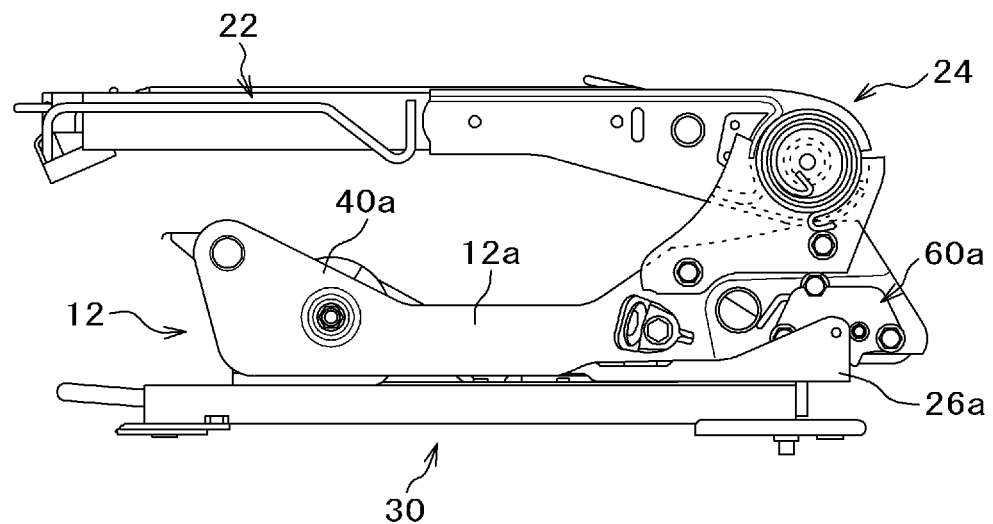
FIG. 6 is a side view showing a state in which a seat back frame is pivoted forward from a position of FIG. 4.
Figure 7:
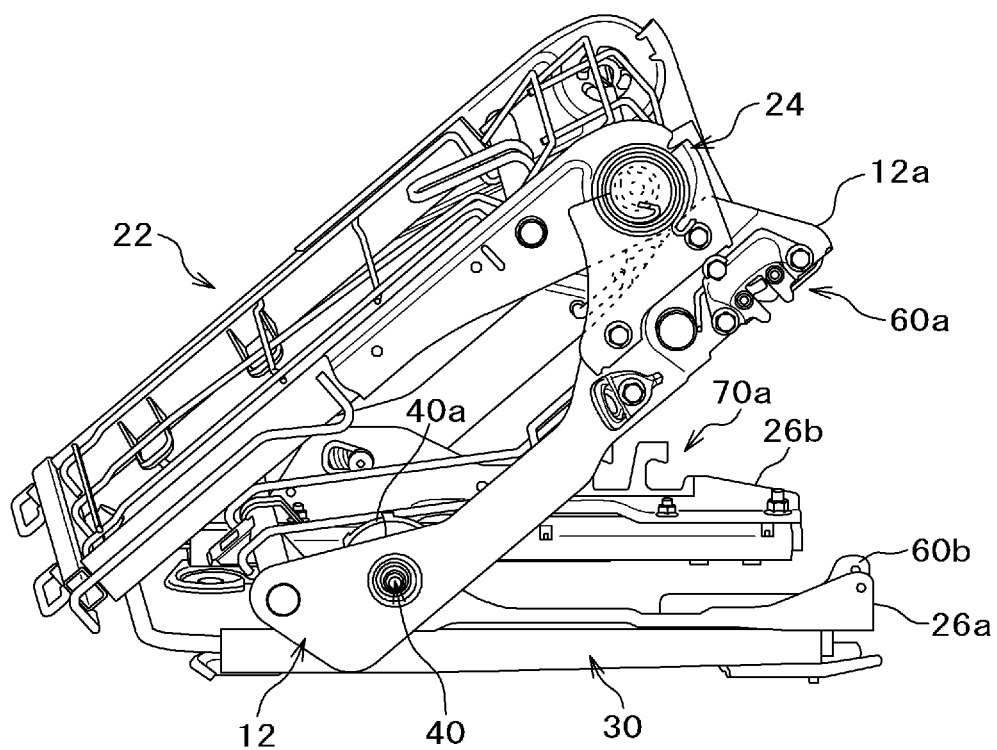
FIG. 7 is a side view showing a state in which the seat structure is pivoted forward from a position of FIG. 6.

FIG. 6 is a side view showing a state in which the seat back frame is pivoted forward from a position of FIG. 4. FIG. 7 is a side view showing a state in which the seat structure is pivoted forward from a position of FIG. 6.

In an initial position of FIG. 2, the seat structure 11 is oriented in an upright position. When the occupant operates a recliner lever not shown, the lock is released and the seat structure 11 is tilted forward by the urging force of the spring of the recliner mechanism 24. As shown in FIG. 6, the seat back frame 22 then falls forward and folds on the seat cushion frame 12.

When the occupant operates a release lever not shown, the locking of the striker 60b in the locking device 60a is released, the seat structure 11 pivots forward by the urging force of the spring 40a of the hinge mechanism 40 and rises up as shown in FIG. 7. Then, as shown in FIG. 1C, the seat structure 11 is held in a storage state standing from the seat slide mechanism 30.

Then, the vehicle seat 1 in the storage posture state falls on the seat slide mechanism 30 against the urging force of the spring of the hinge mechanism 40, and the locking device 60a is pushed toward the striker 60b on the seat slide mechanism 30 and locked to the striker 60b. Again, the vehicle seat 1 is held in a posture state of falling on the seat slide mechanism 30.

Figure 8:
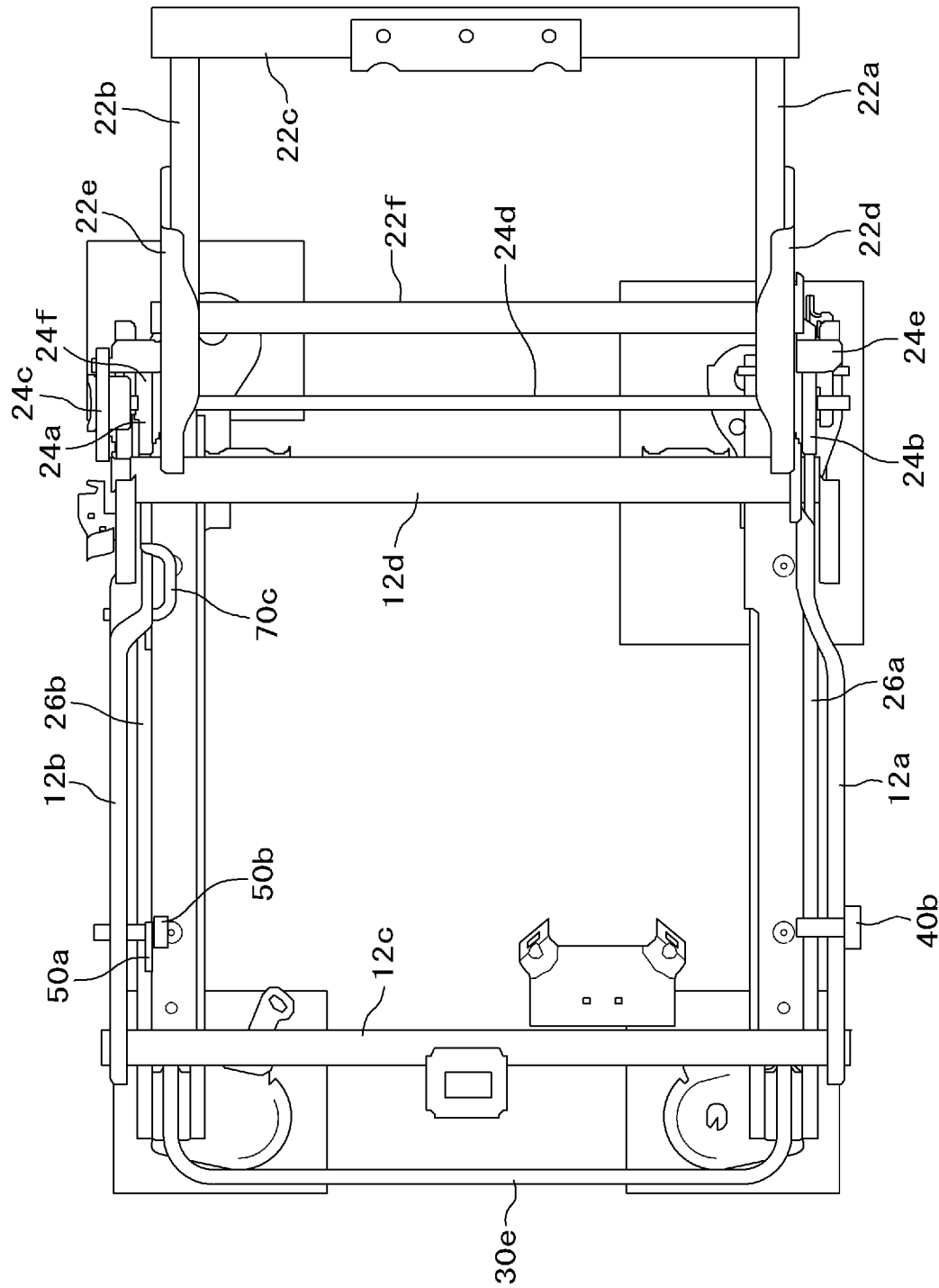
FIG. 8 is a top view of the seat structure in a state where a load is not input.
Figure 9:
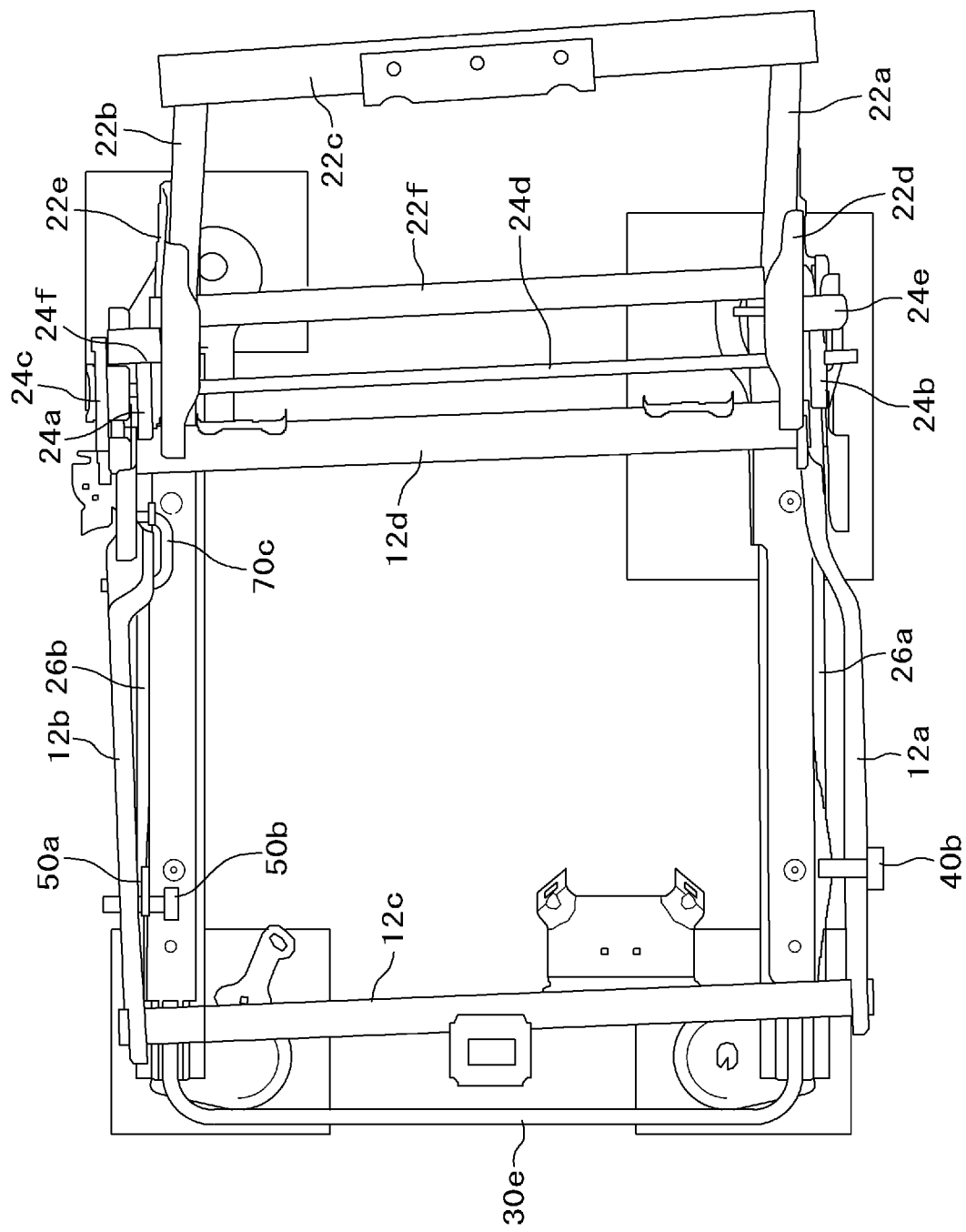
FIG. 9 is a top view of the seat structure in a state where the load is excessively input.
Figure 10:
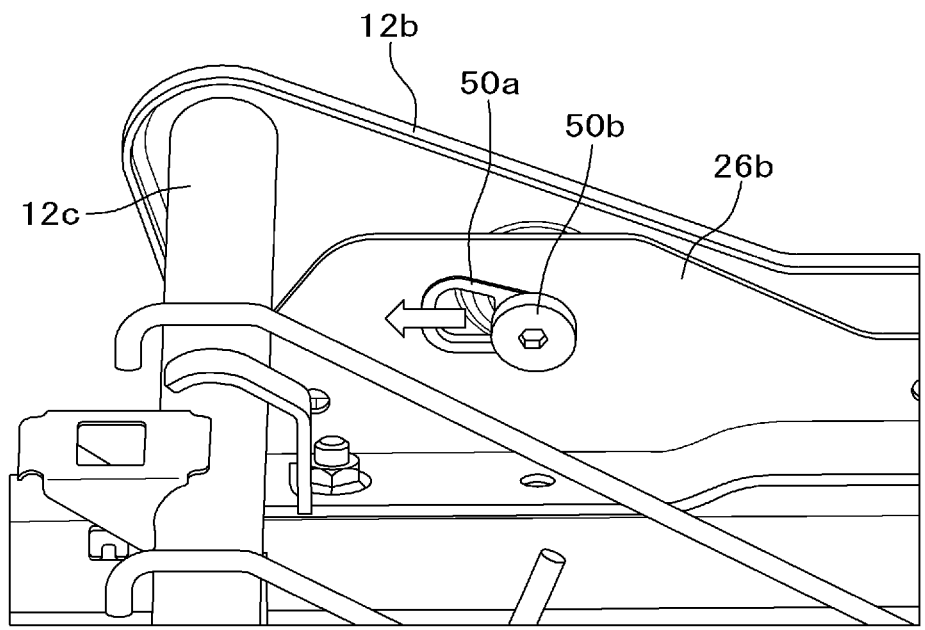
FIG. 10 is a left perspective view of a hinge mechanism 50.
Figure 11:
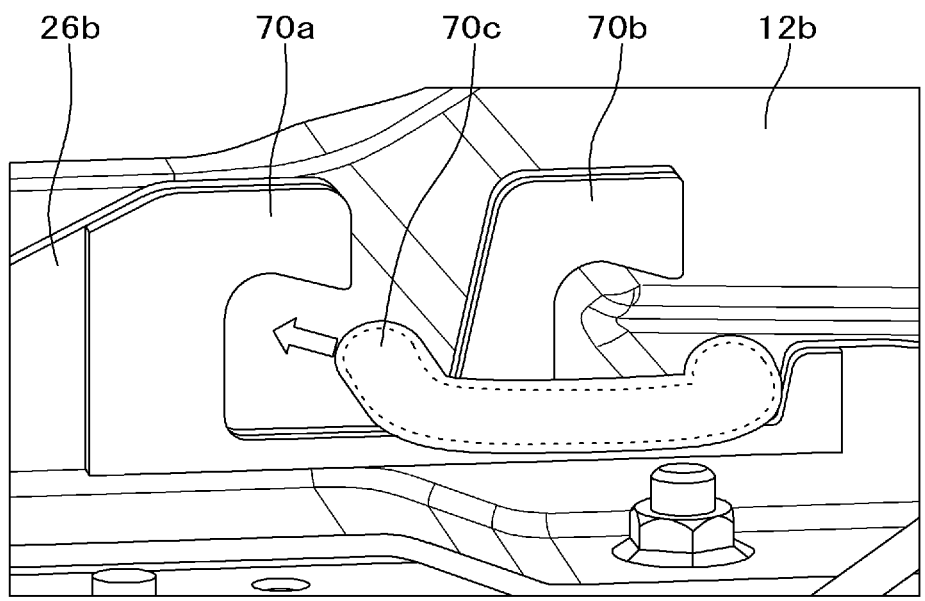
FIG. 11 is a left perspective view of a locking mechanism 70.
Figure 12:
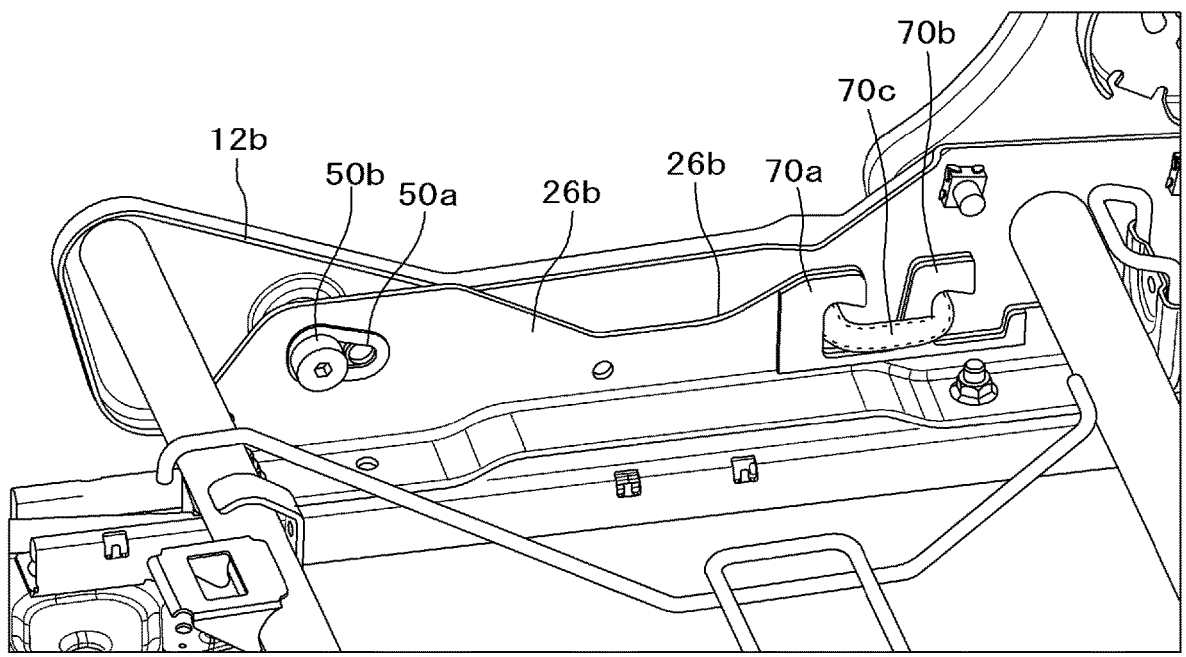
FIG. 12 is a left perspective view of the locking mechanism 70 in a locked state.

Next, the operation when a load is excessively input to the seat structure will be described with reference to FIGS. 8 to 12. FIG. 8 is a top view of the seat structure in a state where a load is not input. FIG. 9 is a top view of the seat structure in a state where the load is excessively input. FIG. 10 is a left perspective view of the hinge mechanism 50. FIG. 11 is a left perspective view of the locking mechanism 70. FIG. 12 is a left perspective view of the locking mechanism 70 in a locked state.

As shown in FIG. 8, the hinge mechanism 50 has the bush 50a capable of moving the hinge pin 50b only when the load is excessively input, but the hinge mechanism 40 has no bush that is capable of moving the hinge pin 40b when the load is excessively input. In the case where the load is excessively input, as shown in FIG. 9, when an excessive load is input, the seat cushion frame 12 deforms and moves forward by the amount of destruction of the wall 50ac of the bush 50a. In this example, the hinge pin 50b of the hinge mechanism 50 moves forward, and the hinge pin 40b of the hinge mechanism 40 is substantially holds the position of the hinge pin 40b other than deformation of the seat cushion frame 12.

In other words, when the load is excessively input to the vehicle seat 1 due to a front collision or the like, the seat slide mechanism 30 does not move, but the seat side member 12b of the seat structure 11 moves forward as indicated by arrows in FIGS. 10 and 11. As a result, as shown in FIG. 12, a part of the bush 50a (the wall 50ac in FIG. 5) is broken, the rotating hinge pin 50b attached to the seat side member 12b of the cushion frame 12 moves forward, and the rear striker 70c is engaged with the hooks 70a and 70b. As a result, the lock mechanism is locked to the right and right sides of the rear end side of the seat cushion frame 12, to thereby improve the safety.

In the embodiment described above, the example in which the vehicle seat 1 is folded as the tumble seat has been described, and an example in which a child seat is attached and not folded will be described with reference to FIG. 1D. FIG. 1D is a side view of the vehicle seat of FIG. 1A in a state of falling forward.

As shown in FIG. 1D, the vehicle seat 1 is rotated forward by a predetermined angle in a state where the child seat 80 is attached to the vehicle seat 1, that is, in a state in which the seat back 20 is inverted and locked, thereby being capable of sitting on and leaving a seat at the rear of the vehicle seat 1.

In other words, when the occupant operates the release lever not shown in a state where the seat back 20 is locked at an initial position of FIG. 1A or FIG. 2, the lock on the striker 60b of the locking device 60a is released, and the seat structure 11 is rotated forward by the urging force of the spring 40a of the hinge mechanism 40 and rises as shown in FIG. 3. In this way, since the recliner mechanism 24 and the locking mechanism 60 can be used independently, as shown in FIG. 1D, the seat structure 11 can be inclined forward even in a state in which the child seat 80 is attached. Incidentally, in the state of FIG. 1D, a top of the vehicle seat 1 becomes high, but if a ceiling of the vehicle is sufficiently high like a minivan, the recliner mechanism 24 and the locking mechanism 60 can be used independently.

Although the invention made by the present inventors has been described in detail based on the embodiment, the present invention is not limited to the above embodiment, and can be subjected to various modifications.

In the embodiment, the example in which the partition wall 50ac of the bush 50a is a communicating wall has been described. However, the partition wall 50ac is not limited to the communicating wall, and any structure may be used as long as the hinge pin can move inside the bush by input of the excessive load. For example, a structure may be employed in which a slit is provided or protrusions are provided on the upper and lower sides.

What is claimed is:

1. A vehicle seat comprising:
   a seat structure having a seat cushion frame including a first seat side member and a second seat side member, and a seat back frame;
   a seat slide mechanism that movably locks the seat structure;
   a first upper riser that is fixed to the seat slide mechanism and supports the first seat side member;
   a second upper riser that is fixed to the seat slide mechanism and supports the second seat side member;
   a first locking mechanism that locks and unlocks the first seat side member to and from the seat slide mechanism;
   a second locking mechanism that locks the second seat side member to the seat slide mechanism when an excessive load is input
   a first hinge mechanism that allows the first seat side member to rotate with respect to the first upper riser; and
   a second hinge mechanism that allows the second seat side member to rotate with respect to the second upper riser;
   wherein the second hinge mechanism includes a rotating hinge pin and a bush, and
   a part of the bush is destroyed and the second seat member is movable when the excessive load is input; and
   wherein the bush has a first hole into which the rotating hinge pin is inserted in an initial state and a second hole that is located in front of the first hole, and
   partition walls of the first hole and the second hole are destroyed when the excessive load is inputted.

2. The vehicle seat according to claim 1, wherein the bush is made of nylon.

3. The vehicle seat according to claim 1,
wherein the second locking mechanism includes a hook that is provided on the second upper riser and a second striker that is provided on the second seat side member, and the second seat side member moves and the second striker is engaged with the hook when the excessive load is input.

4. The vehicle seat according to claim 3,
wherein the hook has a first concave portion and a second concave portion which open rearward, and the second striker is formed of a U-shaped wire.

5. The vehicle seat according to claim 3,
wherein the first locking mechanism includes a first striker that is provided on the first upper riser and a locking device that is provided on the first seat side member, and the locking device releases engagement with the first striker by operating an unlocking lever and the locking device engages the first striker by inserting the locking device into the first striker.

6. The vehicle seat according to claim 5,
wherein the first hinge mechanism includes a spring that assists rotation of the seat structure.

7. The vehicle seat according to claim 1,
wherein the first seat side member and the second seat side member are oriented in a first direction, and the seat back frame is connected to the seat cushion frame by a recliner.

8. The vehicle seat according to claim 1,
wherein the seat slide mechanism includes a first lower rail that is oriented in a first direction, a first upper rail that is engaged with the first lower rail and moves along the first direction, a second lower rail that is oriented in the first direction, and a second upper rail that is engaged with the second lower rail and moves along the first direction, the first upper riser is fixed to the first upper rail, and the second upper riser is fixed to the second upper rail.

9. The vehicle seat according to claim 1,
wherein the seat back frame is folded into the seat cushion frame to allow the seat structure to be raised.

* * * * *